Aug. 18, 1970        A. W. RICHMOND        3,525,044
DIGITAL SPEED AND CONTROL SYSTEM
Filed Feb. 28, 1968        4 Sheets-Sheet 1
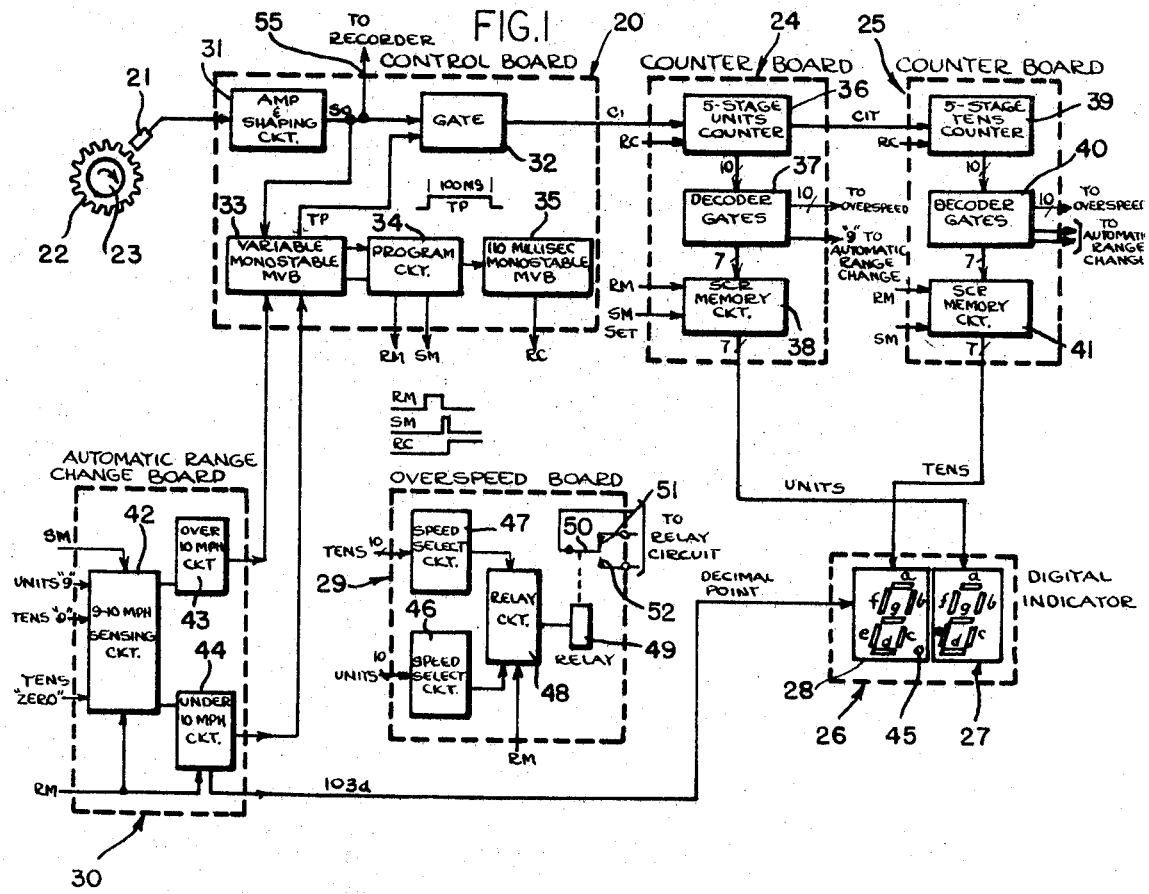
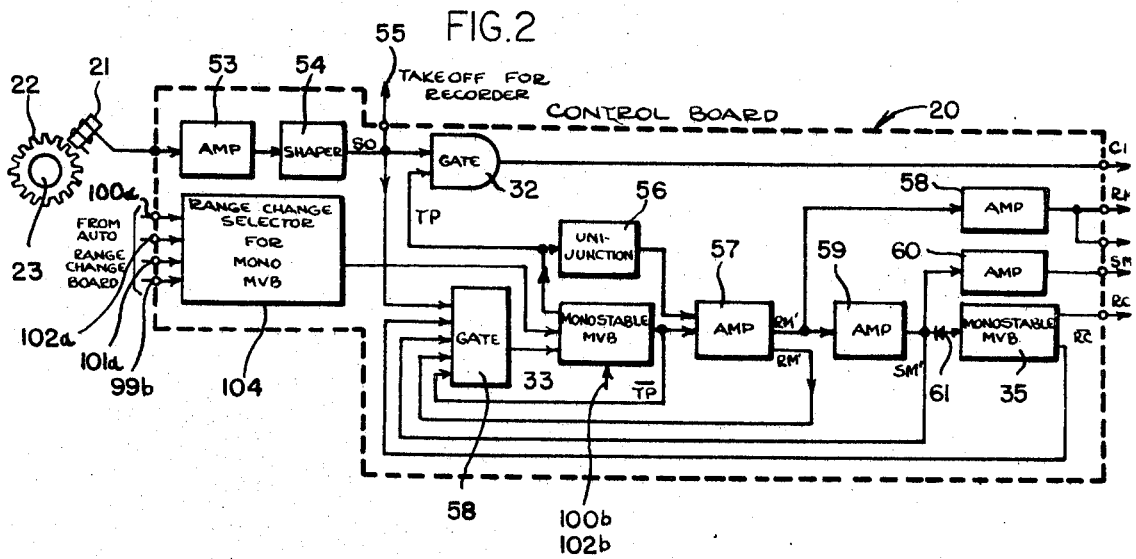
INVENTOR
ABRAHAM W. RICHMOND
ATTY

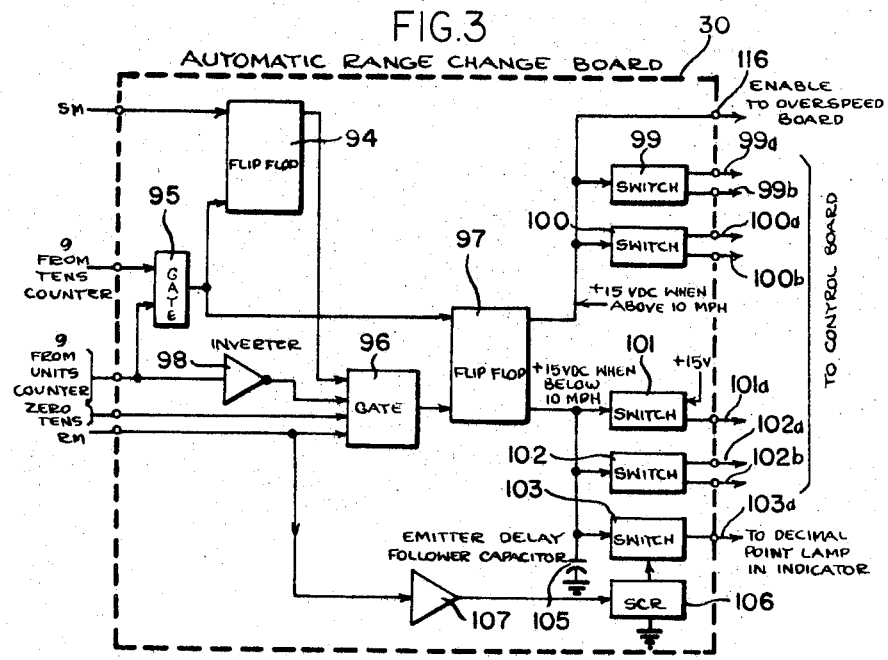
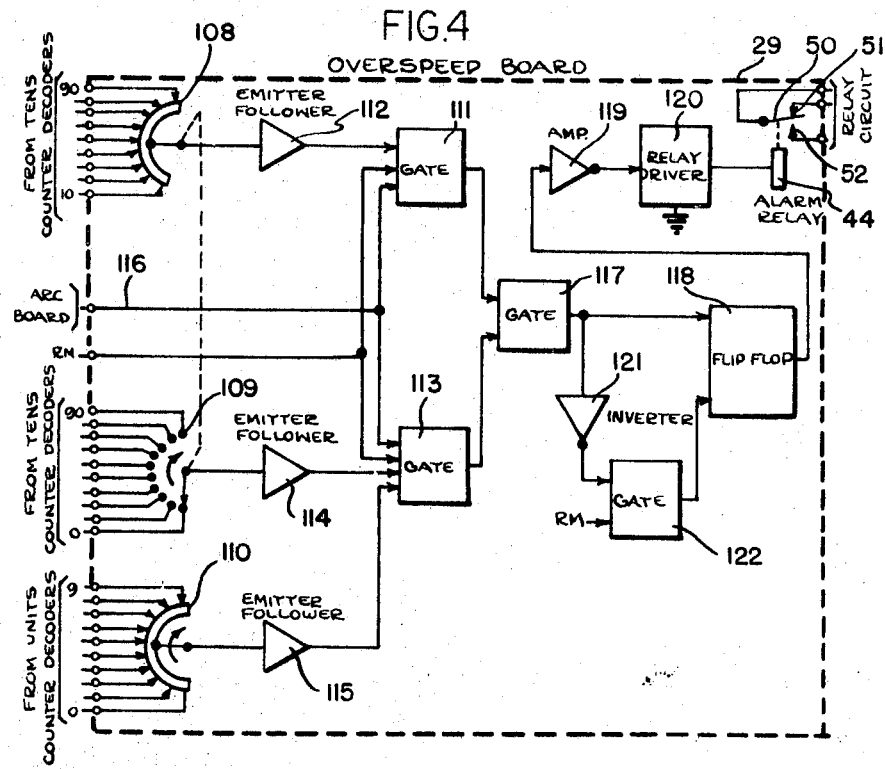

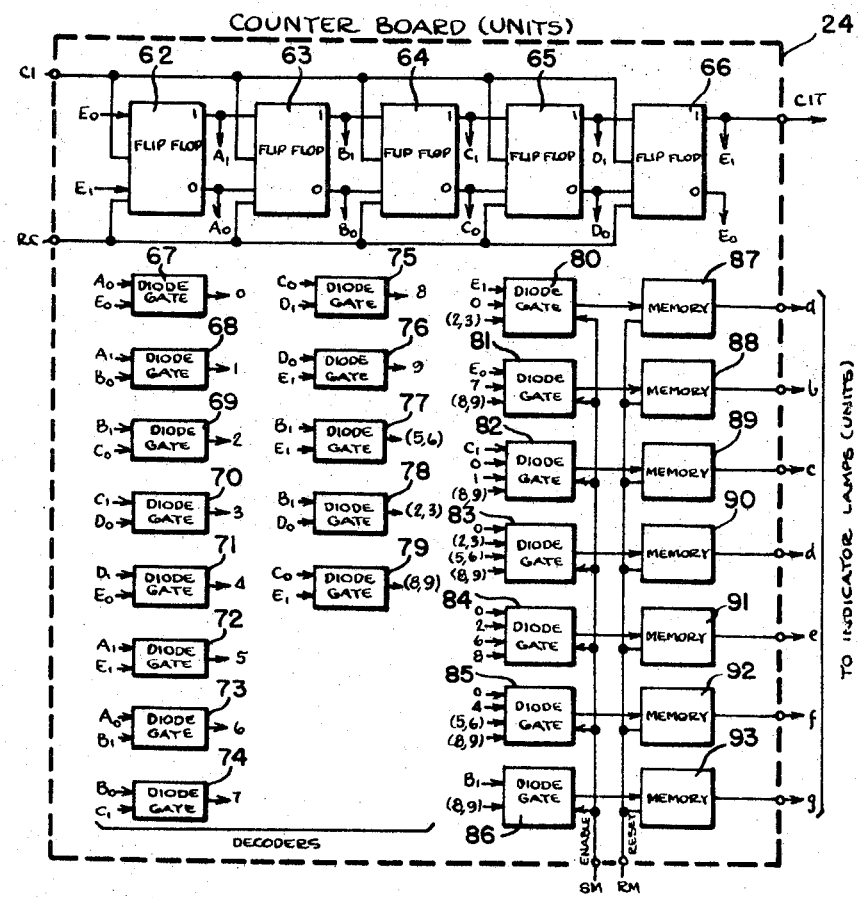
FIG.5
FIG.7
FIG.6
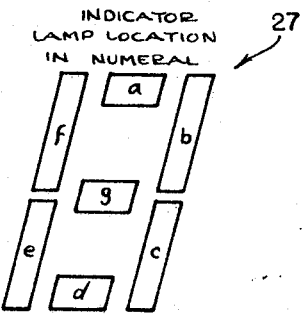
INVENTOR
ABRAHAM W. RICHMOND
ATTY

`United States Patent Office`

3,525,044
Patented Aug. 18, 1970

3,525,044
DIGITAL SPEED AND CONTROL SYSTEM
Abraham W. Richmond, Hickory Hills, Ill., assignor to Vapor Corporation, Chicago, Ill., a corporation of Delaware
Filed Feb. 28, 1968, Ser. No. 709,058
Int. Cl. G01p 3/12
U.S. Cl. 324—173                 9 Claims

ABSTRACT OF THE DISCLOSURE

Digital speed and control system for a vehicle, such as a locomotive to indicate digitally the speed of the vehicle, and including a digital indicator capable of indicating the speed in different ranges, a magnetic pickup coacting with a gear connected directly to the axle of the vehicle, electronic counter means responding to the pulses generated by the pick-up and converting same into a speed reading for the digital indicator, means for detecting the overspeed of a preselected speed, and means for automatically changing the range of speed measured.

---

This invention relates in general to an electronic instrument for providing a visual display of locomotive speed by employing a digital indicator, and more particularly to a digital speed and control system indicator for locomotives capable of detecting overspeed from a preselected speed and capable of automatically changing the range of speed measurement in response to a preselected speed.

Heretofore, speed of a locomotive has been measured with an analog approach such as used in revolutions per mintue counters and the like, where the pulses from the pickup are shaped and clipped and then fed into an integrated network consisting of capacitors and resistors. The combined effect of these resistors and capacitors is to convert the varying frequency of these pulses into an average D.C. voltage, which is then read on a voltage meter calibrated in miles per hour. The problem with this approach is that the accuracy and permanence of calibration becomes to a large extent a function of the accuracy and permanence of the meter which changes in time with the aging of components, thereby effecting the linearity of the electronic system. Meter accuracy is difficult to insure due to vibration and other problems which are encountered on locomotives. Further, when it becomes desirable to utilize the varying D.C. voltage for overspeed trip out or control purposes, switching action must take place at precise and minute changes in voltage. This type of circuitry requires precise calibration and it is very difficult to maintain such calibration over wide temperature swings. Moreover, a meter is inherently unable to permit large figures for easy reading by an engineer, thereby necessitating interpolation of rather small figures which renders accurate reading of speed difficult particularly in hump service where it is especially desirable to read and maintain engine speed in tenths of a mile per hour.

The present invention comprises the digital approach that essentially interprets pulse frequency in terms of miles per hour. The pulses are taken directly from the running gear and delivered to counters that provide a definite output voltage signal for every speed, and the count appears as significant figures on a digital display device thereby eliminating all calibartion and accuracy problems normally associated with a meter readout device. Further, the digital display provides large figures, all of equal size, easily discernible by a quick glance and the only figures recognized are those representing locomotive speed. Finally, the discrete signals available at the counter enable the usage of a simple and accurate means of actuating a relay to operate an overspeed control, or in the case of hump service locomotive, engine speed control. Moreover, the digital approach with discrete signals enables the use of precise numbers in any desired incremental range.

The speed measuring instrument of the present invention includes a sensor or pickup adapted to be mounted in association with a gear that is connected to a wheel of a locomotive, wherein the pickup generates pulses in response to the passing thereby of gear teeth. Thus, the indicated speed of the locomotive is determined by counting gear teeth passing the pickup for a specific period of time. It should be appreciated that the gear may be either the driven gear on the locomotive drive axle or a gear assembly coupled to the axle in a suitable manner. The frequency or number of pulses generated in a specific period of time varies directly as the speed of the locomotive varies. The counting period may be varied where it is desired to have more than one range of speed measured. Further, the timing range may be adjustable for rendering the system applicable to various gear teeth ratios and wheel diameters. Where two ranges are desired, such as the range of 0 to 9.9 miles per hour and the range of 0 to 99 miles per hour, the counting period for the first range is ten times that of the second range. It should be appreciated that the incremental range may be further extended to the hundredths or thousandths if desired.

An electronic timer for providing the timing period of counting pulses from the sensor additionally provides other timing pulses. A counter for counting the pulses from the pickup is opened and closed to the counting pulses depending upon the first pulse signal from the timer. The output from the counter is held in a memory circuit that is tied directly to a digital indicator for indicating the speed of a locomotive. A second pulse is generated from the timer that clears the memory circuit and also the digital indicator. Upon release of this clearing pulse, the memory circuit will receive a new count from the counter and transmit it directly to the digital indicator. A third timing pulse is delivered to the counter for resetting same for receiving the next count while the memory retains the last count until the next reading.

An overspeed circuit is provided that receives the output of the counter and indicates overspeed from a preselected speed to facilitate safe operation of the locomotive.

Inasmuch as it is normally desirable to measure the speed of a locomotive below ten miles per hour in tenths of a mile per hour and above ten miles per hour in one mile per hour increments, an automatic range change circuit is provided that senses the output from the counters as to the speed and automatically readjusts the first timing pulse that meters the sensing pulses to the counter and conditions the digital indicator for the reading in tenths or one mile per hour increments.

Accordingly, it is an object of the present invention to provide a digital speed and control system having a digital detector that is easier to read and eliminates the necessity of interpolating between numbers.

Another object of this invention is in the provision of a digital speed and control system for locomotives having no mechanical drive or moving parts and capable of providing instant detection of actual locomotive speed and complete accuracy without the need for periodic recalibration.

Still another object of this invention is in the provision of a digital speed and control system having an overspeed circuit capable of detecting an overspeed condition from a preselected speed.

A further object of this invention is in the provision of a digital speed and control system having means for measuring a plurality of ranges of speed and means for automatically conditioning the system for measuring any of the ranges as the speed passes from one range to another range.

A still further object of this invention resides in the provision of a digital speed and control system that is devoid of calibration and accuracy problems.

Other objects, features and advantages of the invention will be apparent from the following detailed disclosure, taken in conjunction with the accompanying sheets of drawings, wherein like reference numerals refer to like parts, in which:

FIG. 1 is a block diagram of the digital speed and control system according to the present invention;

FIG. 2 is a detailed block diagram of the control board of the system shown in FIG. 1;

FIG. 3 is a detailed block diagram of the automatic range change board of the system shown in FIG. 1;

FIG. 4 is a detailed block diagram of the overspeed board shown in the system of FIG. 1;

FIG. 5 is a detailed block diagram of the units counter board of the system shown in FIG. 1;

FIG. 6 is a diagrammatic illustration of a digital representation from the digital indicator of the system in FIG. 1;

FIG. 7 is a chart illustrating the lamp energization patterns for the various digits to be illustrated by the digital representation of FIG. 6.

Figure 8:
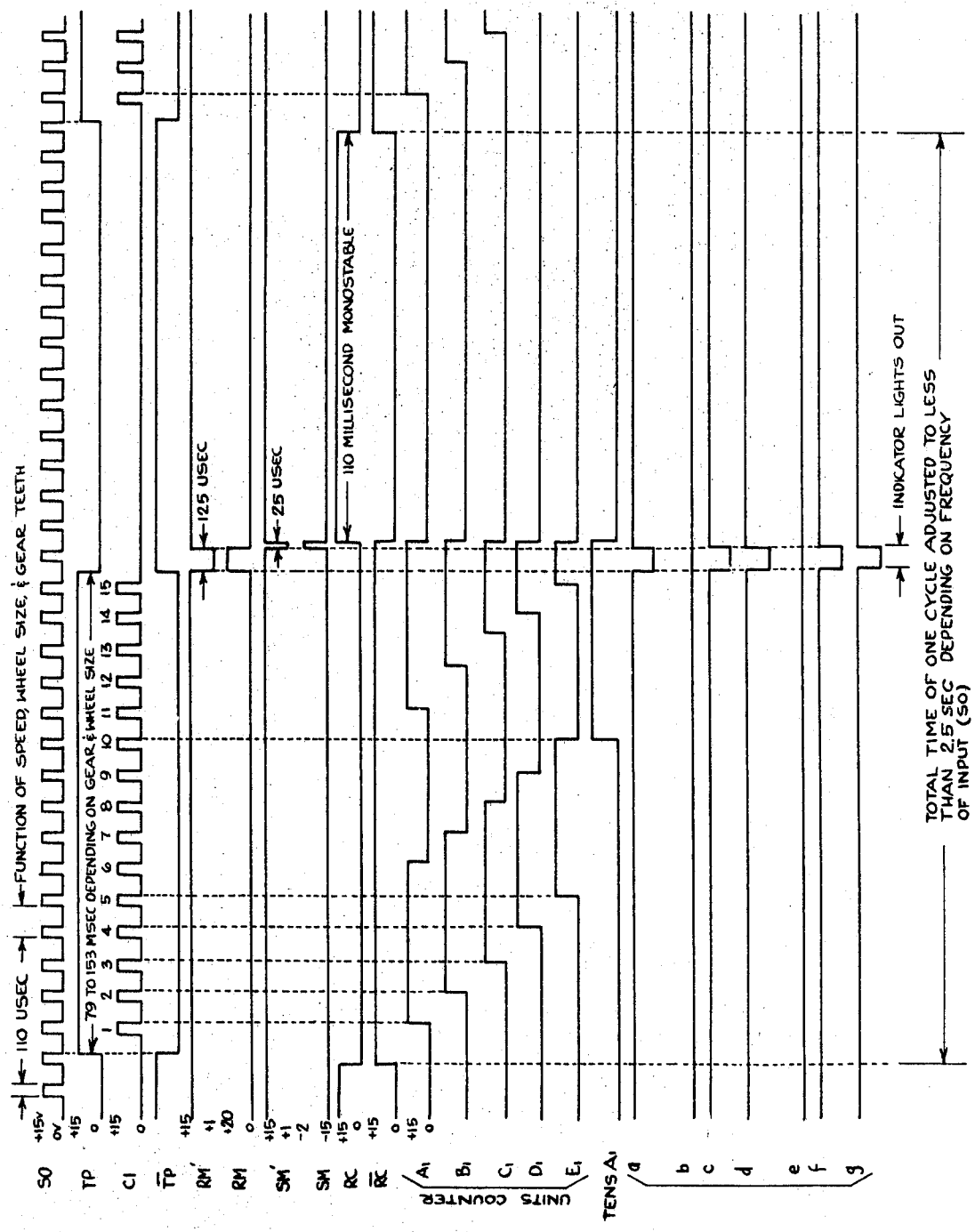
FIG. 8 is a timing diagram for the system of FIG. 1 for a constant speed of fifteen miles per hour.

Referring now to the drawings and particularly to FIG. 1, the digital speed and control system of the present invention includes generally a control board 20 having an input from a pickup or magnetic sensor 21 that is arranged in spaced relation to a gear 22 on an axle 23 of a locomotive. It should be appreciated that the gear 22 may be prt of the drive gear or specially provided for use with the pickup 21 that is arranged in spaced relation to the periphery whereby a pulse is generated upon the passing of one gear tooth thereof to be fed to the control board. The output of the control board 20 is delivered to a units counter board 24 that is in turn interconnected with a tens counter board 25. The units and tens counter boards are directly connected to a digital indicator 26 which includes a units digital representation 27 and a tens digital representation 28. An overspeed board 29 receives the output from the counter boards 24 and 25 and detects overspeed from a preselected speed condition to operate an alarm circuit. The system is conditioned automatically to measure the speed in tenth or one mile per hour increments by an automatic range change board 30 that receives inputs from the counters and delivers outputs to the control board for shifting the timing period of counting pulses generated by the pickup 21.

The control board as seen in FIG. 1 includes generally an amplifying and pulse shaping circuit 31 receiving the output from the pickup 21 and delivering it to a gate 32. The output of the amplifying and shaping circuit is also delivered to a variable monostable multivibrator 33 to start the multivibrator and its counting cycles. A first timing pulse TP is generated by the multivibrator 33 and delivered to the gate 32 to open and close same and allow the metering of sensor pulses to the units counter board 24. A programming circuit 34 is arranged between the variable monostable multivibrator 33 and a fixed monostable multivibrator 35 to program the operation of the control board and the overall system. A memory reset pulse RM and a memory set pulse SM are delivered by the multivibrator 33 through the programming circuit to a memory circuit in the counter boards. A counter reset pulse RC is generated by the multivibrator 35 and delivered to the counters in the counter board. The multivibrators 33 and 35 provide the clocking of the circuit to provide the timing pulses TP, RM, SM and RC, their extent and relationship being shown in the timing chart of FIG. 8. As seen in FIG. 8, the pulse TP in the illustrated embodiment may vary from 79 to 153 milliseconds, depending on gear and wheel size. The length of the pulse RM is fixed at 125 microseconds, and the length of the pulse SM is fixed at 25 microseconds. The length of the pulse RC is 110 milliseconds as also seen by the chart in FIG. 8, the pulse RM starts at the conclusion of the pulse TP, while the pulse SM starts at the conclusion of the pulse RM, and the pulse RC starts at the end of the pulse SM. The entire time of one cycle will be no more than 2.5 seconds, depending upon the frequency of the signal output SO at the output of the amplifying and shaping circuit 31 which comprises the input to the system. The counting period TP is increased in width ten times at speeds below ten miles per hour in the lower range of 0 to 9.9 miles per hour over the period employed for the upper range 0 to 99 miles per hour. While the system illustrated is described for a maximum speed measurement of 99 miles per hours it should be appreciated that another counter board for hundreds and connected digital representation could be added to increase the range to 999 miles per hour.

The units counter board 24 includes generally a five-stage counter 36, delivering a ten lien output through the decoder gates 37 which in turn delivers a ten line output to the overspeed board 29, a digit 9 output to the automatic range change board 30, and a seven line output to the SCR memory circuit 38. The output from the memory circuit 38 is delivered directly to the units digital representation 27 in the digital indicator 26. The counter 36 receives the output from the gate 32 and is reset by the pulse RC from the monostable multivibrator 35. During each timing cycle, the memory circuit 38 is reset by the pulse RM to wash out the old count and set to take a new count by the pulse SM from the clocking timer of the control board.

The tens counter board 25 is identical to the units counter board 24 in that it includes a five-stage counter 39, decoder gate 40, and an SCR memory circuit 41. The tens counter 39 receives the output of the units counter 36 and is reset once during each cycle by the pulse RC. The memory circuit 41 is reset and set by the pulses RM and SM, respectively, in the same manner as the memory circuit of the units counter board. Similar to the units counter board, a ten line output from the decoder gates 40 is delivered to the overspeed board 29, while 0 digit and 9 digit outputs are delivered to the automatic range change board 30.

The automatic range change board includes generally a 9 to 10 mile per hour sensing circuit 42 receiving the inputs from the counter boards 24 and 25, as well as the reset and set pulses RM and SM from the clocking circuit of the control board. The output of the sensing circuit 42 is carried to an over ten mile per hour circuit 43 and an under ten mile per hour circuit 4 for energizing either depending upon the speed sensed. The outputs of the circuits 43 and 44 are delivered to the variable monostable multivibrator to vary the length of the pulse TP for the proper range of measurement. Also the output of the under ten miles per hour circiut 44 is delivered to the digital indicator for operation of the decimal point 45 depending upon the speed range of the system. Thus, depending upon the speed of the locomotive, the system is conditioned to measure in tenth or one mile per hour increments.

The overspeed board as seen in FIG. 1 generally includes a units speed selecting circuit 46 and a tens speed selecting circuit 47, both of which are adjustable to a preselected speed, and which respectively receive the outputs of the units and tens counters. The outputs of the speed selecting circuits is delivered to a relay circuit 48 that operates a relay 49 for driving a switch arm 50 into engagement with either contact 51 or contact 52 that are connected into a relay circuitry for providing a visual or audible signal to the engineer when overspeed is detected.

As seen in the more detailed block diagram of the control board 20 in FIG. 2, the amplifying and shaping circuit may comprise an amplifier 53 and a shaper 54 from which the signal ouptut is delivered to the gate 32. In the event that it is desired to record the programmed speed of the locomotive, a takeoff 55 is provided at the output of the shaper 54. As already mentioned, the sensor pulses generated by the sensor 21 are metered to the counter 36 along line $C_1$ by the opening and closing of gate 32. The timing pulse TP delivered to the gate 32 for opening and closing same is also delivered to a unijunction circuit 56 that delays the timing pulse RM' (the inverse of RM) to the amplifier 57. The monostable multivibrator 33 is started by the gate 58 upon receipt of a signal output from a shaper 54. The output of the amplifier 57 is delivered to the amplifiers 58 and 59, wherein the amplifier 58 inverts the pulse RM' to deliver from the control board the timing pulse RM. The amplifier output pulse SM' of the amplifier 59 is inverted by the amplifier 60 to provide the timing pulse SM for setting of the memory. The output of the amplifier 59 is also delivered to the monostable multivibrator 35 through an isolation diode 61, and the timing pulse RC is produced by the multivibrator 35 and delivered from the control board. The inverted signal $\overline{TP}$, RM', SM' and $\overline{RC}$ are returned to the gate 58 in the programming circuit for programming of the timing pulses delivered from the control board.

Referring now to the detailed block diagram view of the counter board 24 in FIG. 5, the five-stage counter 36 includes serially connected flipflops 62, 63, 64, 65 and 66, each of which receives the input from the line $C_1$ from the control board 20. The reset line RC from the control board is also connected to each of the flipflops. The flipflops 62 to 66, respectively, produce outputs $A_1A_0$, $B_1B_0$, $C_1C_0$, $D_1D_0$, and $E_1E_0$, which are connected to a ten line diode gate that includes diode gates 67, 68, 69, 70, 71, 72, 73, 74, 75 and 76; and to a seven line diode gate that includes diode gates 77, 78, 79, 80, 81, 82, 83, 84, 85 and 86. The ten and seven line diode gates constitute the decoders for the flipflops. As is illustrated in FIG. 5, the diode gates 67 to 76, respectively, represent the flipflop digital outputs 0, 1, 2, 3, 4, 5, 6, 7, 8 and 9. The diode gates 77, 78 and 79, respectively, represent the flipflop digital outputs (5, 6), (2, 3), and (8, 9). These diode gates are turned on by the respective combination of outputs from the flipflops as is illustrated. Similarly, the diode gates 80 to 86 are turned on by the designated outputs from the flipflops and the outputs from the diode gates 67 to 79.

The diode gates 80, 81, 82, 83, 84, 85 and 86, respectively, activate the memories 87, 88, 89, 90, 91, 92 and 93 which are in turn connected to the indicator lamps $a$, $b$, $c$, $d$, $e$, $f$ and $g$ of the digital representation 27 in the digital indicator 26. The memories 87 to 93 are reset by the memory reset timing pulse RM for receiving a new count, and are set with a new count by the memory set pulse SM.

While only the units counter board 24 is illustrated, it will be appreciated that the tens counter board 25 is identical and receives the output from the flipflop 65 on line C1T.

The units output $a$ to $g$ is received by the digital representation 27, FIGS. 1 and 6, where it is illustrated as to the lamps to which the output lines are connected. The combination of lamps to be energized for each count is shown in the chart of FIG. 7. For example, to establish the count "0", the output lines from the counter board 24 and associated lamps $a$, $b$, $c$, $d$, $e$ and $f$ will be energized, while the count "1" will be established by energization of the output lines and lamps $b$ and $c$. The establishment of the other numeral in the digital representation is clearly shown in the chart of FIG. 7. While this represents the units digital representation, it can be appreciated that the tens digital representation will operate in the same manner in accordance with the output of the tens counter board 25.

A detailed block diagram of the automatic range change board 30 is shown in FIG. 3. This board functions to recognize whether the speed of the locomotive is above or below ten miles per hour and then automatically sets the range of the system to measure tenth or one mile per hour increments. A flipflop 94 receives the memory set timing pulse SM and the output from a gate 95, and is conditioned when the gate 95 is on to deliver an output to a further gate 96. Inputs from the digit 9 of the tens counter and the digit 9 from the units counter turn on the gate 95 when the speed is 9.9 and increasing to shift from low to high range speed measurement. The output from the gate 95 also leads to a flipflop 97 that recognizes whether the speed is below or above ten miles per hour. The gate 96 also receives the signal from the units counter digit 9 through an inverter 98 that delivers a minus signal to the gate. The gate 96 is continually conditioned during each counting cycle by the memory reset timing pulse RM, and the gate 96 also recognizes the 0 from the tens counter. When the speed is above ten miles per hour, the flipflop 97 conditions "on" the switches 99 and 100, while when the speed is below ten miles per hour the flipflop conditions "on" the switches 101, 102 and 103. The outputs 99$b$, 100$a$, 101$a$, and 102$a$ are connected into the control board and into the monostable multivibrator selector 104 (FIG. 2), while the switch outputs 100$b$ and 102$b$ are connected into the monostable multivibrator 33. The output 99$a$ of the switch 99 is connected directly to a plus 15 volt line, while the output 103$a$ of the switch 103 is connected to the decimal point 25 of the digital indicator 26. A delay capacitor 105 connected to the switch 103 serves to delay the information for conditioning the decimal point lamp in the digital indicator sufficiently to prevent undesirable fast flipping on and off of the decimal point lamp. An SCR 106 turns on the decimal point lamp through the switch 103 in response to the memory reset timing pulse RM that is delivered to the SCR 106 through an emitter follower 107.

The overspeed board 29, FIG. 4, incldes at the input side a 9-point shorting bar switch 108 receiving outputs from the tens counter decoders 10, 20, 30, 40, 50, 60, 70, 80 and 90, and is operable together with a 10-point selecting switch 109 that receives from the tens counter decoders outputs 0, 10, 20, 30, 40, 50, 60, 70, 80 and 90. A 10-point shorting bar switch 110 receives from the units counter decoders outputs 0, 1, 2, 3, 4, 5, 6, 7, 8 and 9. The shorting bar switch 108 is connected to a gate 111 through an emitter follower 112, while the selecting switch 109 and shorting bar switch 110 are connected to a gate 113 respectively through emitter followers 114 and 115. The gates 111 and 113 receive the memory reset timing pulse RM to reset the gates during each counting cycle. A signal comes into the overspeed board on the line 116 from the automatic range change board 30 to permit operation of the overspeed board when the locomotive is above ten miles per hour. It is only desirable to use the overspeed board in the high range, but if it is necessary or desirable to use the overspeed board in the lower range, the signal from the line 116 would be deleted.

The gates 111 and 113 would open upon the locomotive speed reaching or exceeding the preselected speed set in the selecting switches 108, 109 and 110 to open a further gate 117. Opening of the gate 117 conditions a flipflop 118 to operate the alarm relay 49 through an amplifier 119 and a relay driver 120. The flipflop 118 is reset upon closing of the gate 117 through an inverter 121 and a gate 122. The gate 122 is opened upon closing of the gate 117 and receipt of the memory reset timing pulse RM. Preferably, the overspeed board circuitry is such that the relay 49 will be energized when the locomotive speed is less than the preselected speed on the selector switches 108, 109 and 110, whereby detection of an overspeed condition will cause the relay 48 to fall out. Thus, the engineer of the locomotive can be warned by a visual and/or audio signal through the relay circuit connections of the relay 49 of an overspeed condition without having to observe the digital indicator 26.

Each counting cycle as dictated by the timing pulse TP together with the subsequent timing pulses RM, SM and RC takes no more than 2.5 seconds. The timing pulses RM and SM, controlling the memory circuits, are extremely short, such as about 150 microseconds. This is considerably faster than the eye can detect, whereby the digital indicator 45 effectively gives a continuous reading, changing only when the speed changes by the value of one increment.

It will be understood that modifications and variations may be effected without departing from the scope of the novel concepts of the present invention.

The invention is hereby claimed as follows:

1. In a digital speed and control system for measuring the speed of a wheeled vehicle, said system having a plurality of speed ranges, a digital indicator capable of indicating each of the ranges, a gear connected to an axle of said vehicle, a vehicle wheel connected to said axle, a sensor at the periphery of said gear for generating one pulse in response to the passing thereby of each gear tooth, counter means for receiving and counting the output of said sensor, a gate between the output of the sensor and the input of the counter means, timing means producing first, second, and third timing pulse outputs, means connecting said first timing pulse output to said gate for opening same during said first timing pulse to permit counting by said counter means of the sensor pulses, said first timing pulse output being set pursuant to the number of gear teeth on said gear, means for varying the length of said first timing pulse to accommodate a range of gear and wheel sizes, the driving connection between the gear and wheel and the diameter of the wheel, a memory circuit receiving the output of said counter means, means connecting said second timing pulse output to said memory circuit for clearing same to receive a new count, means connecting said third timing pulse output to said counter means to reset same for a subsequent count, means receiving the output of said counter means for detecting the speed of said vehicle to automatically adjust said first timing pulse to set the speed range of the system, and means connecting the output of said memory circuit to said digital indicator to cause the indicator to be conditioned by the memory circuit to reflect the state of the memory circuit.

2. In a digital speed and control system as defined in claim 1, and further including means connected to the output of said counter means to detect overspeed relative to a predetermined speed.

3. In a digital speed and control system for measuring the speed of a vehicle having a range of 0–99 miles per hour in the range of 0–99 miles per hour in one mile per hour increments or in the range of 0–9.9 miles per hour in one tenth of a mile per hour increments, a digital indicator having a units digital representation and a tens digital representation with a decimal point representation therebetween, said vehicle including an axle with a wheel thereon, a gear connected to said axle, a stationary magnetic pickup at the periphery of said gear in closely spaced relation to the teeth of the gear for generating one pulse for every gear tooth passing thereby, an electronic units counter receiving the output of said pickup, an electronic tens counter interconnected and coacting with said units counter, a gate between the output of the sensor and the input of said units counter, an electronic timing means producing first, second anrd third timing pulse outputs, means connecting said first timing pulse output to said gate for opening same during said first timing pulse to start counting by said units and tens counters of said pickup pulses, said first timing pulse output being electronically set pursuant to the number of teeth on said gear and the diameter of said wheel and being shiftable for either of said ranges, a units memory circuit receiving the output of said units counter, a tens memory circuit receiving the output of said tens counter, means connecting said second timing pulse output to said memory circuits for clearing same to receive a new count subsequent to each new count in said counters, means connecting said third timing pulse output to said counters to reset same to zero for a new count subsequent to delivery of their counts to the memory circuits, means connecting the outputs of said units and tens memory circuits respectively to said units and tens digital representations to continually condition the indicator in accordance with the counts in said memory circuits, and means receiving the output of said counters for detecting the speed of the vehicle to automatically set the speed range and vary the length of said first timing pulse output to condition the system to measure speed in the range 0–99 miles per hour when the vehicle speed is above 9.9 miles per hour and to measure speed in the range 0–9.9 miles per hour when the vehicle speed is below 10 miles per hour and to control the decimal point representation.

4. In a digital speed and control system as defined in claim 3, and means for adjusting the length of said first timing pulse output to accommodate a range of gear and wheel sizes.

5. In a digital speed and control system as defined in claim 3, wherein said first timing pulse output is between .079 to 1.53 seconds.

6. In a digital speed and control system as defined in claim 3, and means connected to the output of said counters to detect overspeed relative to a preselected speed and energize an alarm circuit.

7. In a digital speed and control system as defined in claim 6, and means adjusting said overspeed detecting means for detection of any preselected speed within the range of the system.

8. In a digital speed and control system as defined in claim 3, wherein each digital representation includes seven light emitting bars individually energizable and in symmetrical figure-8 arrangement to permit the establishment of any digit, and said decimal point is light illuminable and conditioned by said automatic speed range detecting and setting means.

9. In a digital speed and control system for measuring the speed of a locomotive having a range of 0–99 miles per hour in the range of 0–99 miles per hour in one mile per hour increments or in the range of 0–9.9 miles per hour in one tenth of a mile per hour increments, a digital indicator having a units digital representation and a tens digital representation with a decimal point representation therebetween, said locomotive including an axle with a wheel thereon, a gear connected to said axle a stationary magnetic pickup at the periphery of said gear in closely spaced relation to the teeth of the gear for generating one pulse for every gear tooth passing thereby, an electronic units counter receiving the output of said pickup, an electronic tens counter interconnected and coacting with said units counter, a gate between the output of the sensor and the input of said units counter, an electronic timing means producing first, second, third, and fourth timing pulse outputs, means connecting said first timing pulse output to said gate for opening same during said first timing pulse to start counting by said units and tens counters of said pickup pulses, said first timing pulse output being electronically set pursuant to the number of teeth on said gear and the diameter of said wheel and being shiftable for either of said ranges, a units memory circuit receiving the output of said units counter, a tens memory circuit receiving the output of said tens counter, means connecting said second timing pulse output to said memory circuits for clearing same to receive a new count subsequent to each new count in said counters, means connecting said third timing pulse output to said memory circuits to set same with a new count, means connecting said fourth timing pulse output to said counters to reset same to zero for a new count subsequent to delivery of their counts to the memory circuits, means connecting the outputs of said units and tens memory circuits respectively to said units and tens digital representations to continually condition the indicator in accordance with the counts in said memory circuits, and means receiving the output of said counters for detecting the speed of the locomotive to automatically set the speed range and vary the length of said first timing pulse output to condition the system to measure speed in the range 0–99 miles per hour when the locomotive speed is above 9.9 miles per hour and to measure speed in the range 0–9.9 miles per hour when the locomotive speed is below 10 miles per hour and to control the decimal point representation.

References Cited

UNITED STATES PATENTS

| | | | |
|---|---|---|---|
| 2,705,303 | 3/1955 | Stinger | 324—70 |
| 3,263,064 | 7/1966 | Lindars | 324—78 |
| 3,441,943 | 4/1969 | McCue | 324—70 |

OTHER REFERENCES

Ed Bukstein—New Techniques of Frequency Measurement—in Electronics World—November 1960, pp. 51–53 and 116.

RUDOLPH V. ROLINEC, Primary Examiner

M. J. LYNCH, Assistant Examiner

U.S. Cl. X.R.

324—79